(12) United States Patent
Song et al.

(10) Patent No.: US 12,087,512 B2
(45) Date of Patent: *Sep. 10, 2024

(54) ELECTRONIC COMPONENT AND BOARD HAVING THE SAME

(71) Applicant: SAMSUNG ELECTRO-MECHANICS CO., LTD., Suwon-si (KR)

(72) Inventors: Gyeong Ju Song, Suwon-si (KR); Beom Joon Cho, Suwon-si (KR); Seung Min Ahn, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/196,257

(22) Filed: May 11, 2023

(65) Prior Publication Data

US 2023/0282422 A1  Sep. 7, 2023

Related U.S. Application Data

(63) Continuation of application No. 17/333,817, filed on May 28, 2021, now Pat. No. 11,749,460.

(30) Foreign Application Priority Data

Oct. 28, 2020  (KR) .................. 10-2020-0140954

(51) Int. Cl.
*H01G 4/30* (2006.01)
*H01G 2/06* (2006.01)
(Continued)

(52) U.S. Cl.
CPC ............... *H01G 4/30* (2013.01); *H01G 2/065* (2013.01); *H01G 4/012* (2013.01); *H01G 4/1209* (2013.01); *H01G 4/232* (2013.01)

(58) Field of Classification Search
CPC .......... H10G 4/30; H01G 2/065; H01G 4/012; H01G 4/1209; H01G 4/232
(Continued)

(56) References Cited

U.S. PATENT DOCUMENTS

2008/0024960 A1  1/2008  Hidaka
2014/0055910 A1  2/2014  Masuda
(Continued)

FOREIGN PATENT DOCUMENTS

JP  2001-126946 A  5/2001
JP  2015-062215 A  4/2015
(Continued)

OTHER PUBLICATIONS

U.S. Final Office Action dated Feb. 16, 2023 issued in U.S. Appl. No. 17/333,817.
(Continued)

*Primary Examiner* — Arun Ramaswamy
(74) *Attorney, Agent, or Firm* — Morgan, Lewis & Bockius LLP

(57) ABSTRACT

There are provided an electronic component and a board including the same. The electronic component includes: a capacitor body; a pair of external electrodes respectively disposed on both ends of the capacitor body; and a pair of metal frames including a pair of connection portions connected to the pair of external electrodes, respectively, and a pair of mounting portions connected to the pair of connection portions, respectively. A bottom surface of one of the pair of mounting portions has roughness.

7 Claims, 10 Drawing Sheets

(51) Int. Cl.
*H01G 4/012* (2006.01)
*H01G 4/12* (2006.01)
*H01G 4/232* (2006.01)

(58) Field of Classification Search
USPC .................. 361/301.4, 306.3, 321.1, 321.3
See application file for complete search history.

(56) References Cited

U.S. PATENT DOCUMENTS

| | | |
|---|---|---|
| 2014/0168851 A1 | 6/2014 | Lee |
| 2015/0021080 A1* | 1/2015 | Lee .................. H01G 4/30 |
| | | 361/301.4 |
| 2015/0054388 A1 | 2/2015 | Itagaki et al. |
| 2015/0075853 A1 | 3/2015 | Lee et al. |
| 2018/0033556 A1 | 2/2018 | Itamochi |
| 2019/0080841 A1 | 3/2019 | Ando |
| 2021/0027945 A1* | 1/2021 | Takahashi ............ H01G 4/2325 |

FOREIGN PATENT DOCUMENTS

| | | |
|---|---|---|
| JP | 2018-018938 A | 2/2018 |
| KR | 10-1548804 B1 | 8/2015 |

OTHER PUBLICATIONS

U.S. Non-Final Office Action dated Aug. 17, 2022 issued in U.S. Appl. No. 17/333,817.

\* cited by examiner

ELECTRONIC COMPONENT AND BOARD HAVING THE SAME

CROSS-REFERENCE TO RELATED APPLICATION(S)

This application is a continuation patent application of U.S. patent application Ser. No. 17/333,817, filed on May 28, 2021, which claims benefit of priority to Korean Patent Application No. 10-2020-0140954 filed on Oct. 28, 2020, the disclosures of which are incorporated herein by reference in their entireties.

TECHNICAL FIELD

The present disclosure relates to an electronic component and a board including the same.

BACKGROUND

A multilayer capacitor has been used as several electronic apparatuses since it has a small size may implement high capacitance.

Recently, in accordance with the rapid rise of eco-friendly vehicles and electric vehicles, the importance of a power driving system inside the vehicle has increased. Therefore, a demand for a multilayer capacitor required for the power driving system has also increased.

The multilayer capacitor has been required to have a high level of thermal reliability, electrical reliability, and mechanical reliability in order to be used as a component for the vehicle.

In particular, in accordance with an increase in a density of components mounted inside the vehicle, a multilayer capacitor which is easily installed in a limited space, may implement high capacitance, and has excellent durability against vibrations and deformation has been required.

In addition, as a method of improving durability of the multilayer capacitor against vibrations and deformation, there is a method of mounting a multilayer capacitor so as to be spaced apart from a circuit board using a metal frame.

However, in a case of an electronic component using such a metal frame, a surface of the metal frame is smooth, and the metal frame may thus be easily deteriorated at a portion in contact with an electrode pad of the circuit board when the electronic component is mounted on the circuit board.

SUMMARY

An aspect of the present disclosure may provide an electronic component in which durability of a multilayer capacitor against vibrations and deformation may be improved, while bonding force between a metal frame of the electronic component and a circuit board may be improved, and a board including the same.

According to an aspect of the present disclosure, an electronic component may include: a capacitor body; a pair of external electrodes respectively disposed on opposite end surfaces of the capacitor body; and a pair of metal frames respectively including a pair of connection portions connected to the pair of external electrodes, respectively, and a pair of mounting portions connected to the pair of connection portions, respectively. A bottom surface of one of the pair of mounting portions has roughness.

The roughness of the bottom surface of the one mounting portion may be 5 μm to 75 μm.

The bottom surface of the one mounting portion may have an uneven shape.

The bottom surface of the one mounting portion may have a mesh pattern.

The bottom surface of the one mounting portion may have protrusion portions and recessed portions alternately disposed.

The one mounting portion may have a thickness of 100 μm to 300 μm.

The capacitor body may include dielectric layers and a plurality of internal electrodes alternately disposed with one of the dielectric layers interposed therebetween.

One of the pair of external electrodes may include: a head portion disposed on one surface of the capacitor body; and a band portion extending from the head portion to portions of upper and lower surfaces and opposite side surfaces of the capacitor body.

One of the pair of connection portions may be connected to the head portion, and the one mounting portion may be bent at and extend from a lower end of the one connection portion.

According to another aspect of the present disclosure, a board having an electronic component may include: a circuit board; a pair of external electrodes disposed on opposite end surfaces of a capacitor body, respectively; a pair of metal frames respectively including a pair of connection portions connected to the pair of external electrodes, respectively, and a pair of mounting portions connected to the pair of connection portions, respectively; and a pair of electrode pads disposed on an upper surface of the circuit board so that the pair of metal frames are connected thereto, respectively, wherein a bottom surface of one of the pair of mounting portions has roughness, and an upper surface of one of the pair of electrode pads, on which the one mounting portion is disposed, has roughness.

The roughness of the bottom surface of the one mounting portion and the roughness of the upper surface of the one electrode pad may be 5 μm to 75 μm.

The bottom surface of the one mounting portion and the upper surface of the one electrode pad may have an uneven shape.

The bottom surface of the one mounting portion and the upper surface of the one electrode pad may have a mesh pattern.

The bottom surface of the one mounting portion and the upper surface of the one electrode pad may have protrusion portions and recessed portions alternately disposed.

According to another aspect of the present disclosure, an electronic component may include: a capacitor body including a dielectric layer and first and second internal electrodes with the dielectric layer disposed between the first and second internal electrodes; a first external electrode disposed on the capacitor body and connected to the first internal electrode; a second external electrode disposed on the capacitor body and connected to the second internal electrode; a first metal frame connected to the first external electrode and including a first mounting portion; and a second metal frame connected to the second external electrode and including a second mounting portion. One of the first and second mounting portions has a surface roughness greater than a surface roughness of a portion of a surface of the capacitor body between the first external electrode and the second external electrode.

A bottom surface of the one of the first and second mounting portions having the surface roughness may have an uneven shape.

A bottom surface of the one of the first and second mounting portions having the surface roughness may have a mesh pattern.

A bottom surface of the one of the first and second mounting portions having the surface roughness may have protrusion portions and recessed portions alternately disposed.

The first metal frame may include a first connection portion connected to the first external electrode, the first mounting portion bent from the first connection portion towards the second mounting portion. The second metal frame may include a second connection portion connected to the second external electrode, the second mounting portion bent from the second connection portion towards the first mounting portion.

The electronic component may further include: a first conductive bonding layer connecting the first connection portion to the first external electrode; and a second conductive bonding layer connecting the second connection portion to the second external electrode. The first mounting portion may be spaced apart from the first external electrode, and the second mounting portion may be spaced apart from the second external electrode.

According to another aspect of the present disclosure, a board having an electronic component may include: a circuit board including first and second electrode pads disposed on the circuit board; and an electronic component. The electronic component may include: a capacitor body including a dielectric layer and first and second internal electrodes with the dielectric layer disposed between the first and second internal electrodes; a first external electrode disposed on the capacitor body and connected to the first internal electrode; a second external electrode disposed on the capacitor body and connected to the second internal electrode; a first metal frame connected to the first external electrode and including a first mounting portion connected to the first electrode pad; and a second metal frame connected to the second external electrode and including a second mounting portion connected to the second electrode pad. One of the first and second mounting portions may have a surface roughness greater than a surface roughness of a portion of a surface of the capacitor body between the first external electrode and the second external electrode.

One of the first and second electrode pads connected to the one of the first and second mounting portions may have a surface roughness greater than the surface roughness of the portion of the surface of the capacitor body between the first external electrode and the second external electrode.

The first metal frame may include a first connection portion connected to the first external electrode, the first mounting portion bent from the first connection portion towards the second mounting portion. The second metal frame may include a second connection portion connected to the second external electrode, the second mounting portion bent from the second connection portion towards the first mounting portion.

The board may further include: a first solder connecting the first mounting portion to the first electrode pad; and a second solder connecting the second mounting portion to the second electrode pad.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
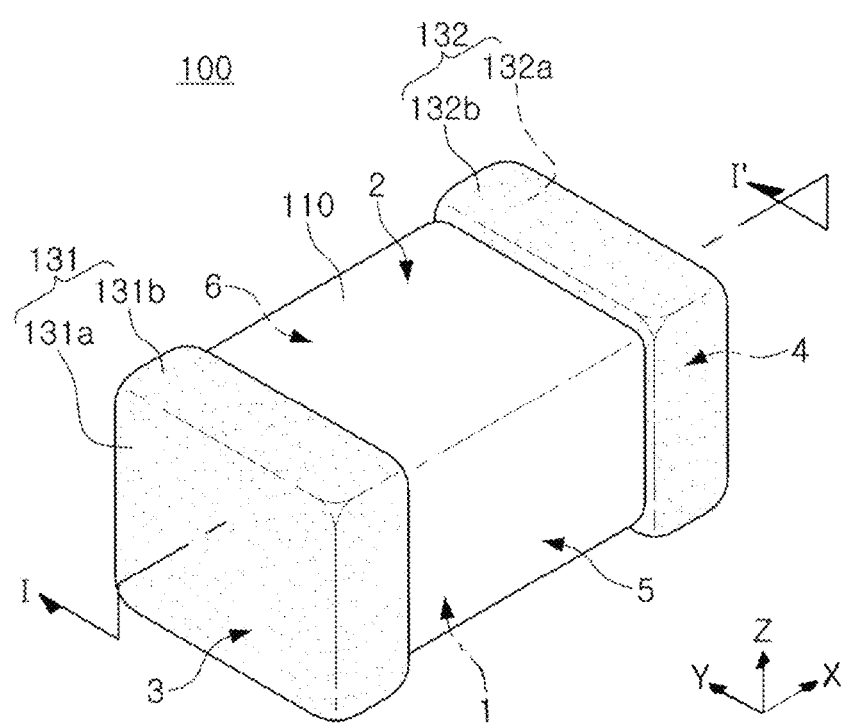
FIG. 1 is a schematic perspective view illustrating a multilayer capacitor according to an exemplary embodiment in the present disclosure.

Hereinafter, exemplary embodiments of the present disclosure will now be described in detail with reference to the accompanying drawings.

Directions will be defined in order to clearly describe exemplary embodiments in the present disclosure. X, Y and Z in the drawings refer to a length direction, a width direction, and a thickness direction of a multilayer capacitor and an electronic component, respectively.

Here, the Z direction may be used as the same concept as a stacked direction in which dielectric layers are stacked in the present exemplary embodiment.

Figure 2A:
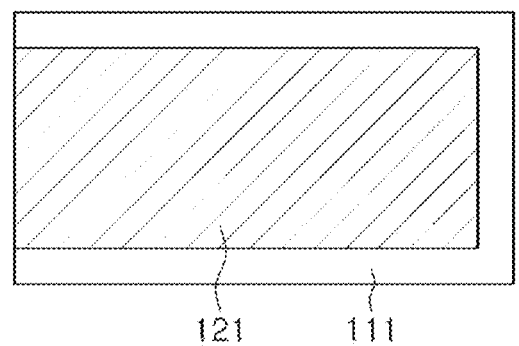
FIGS. 2A and 2B are plan views illustrating, respectively, first and second internal electrodes of FIG. 1.
Figure 2B:
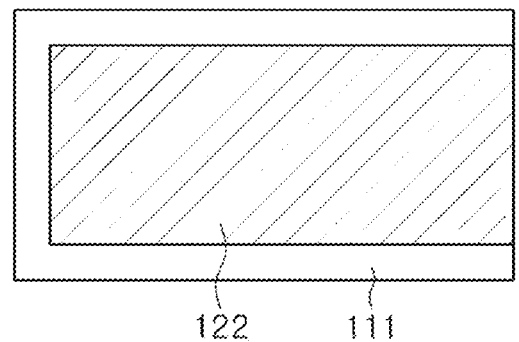
Figure 3:
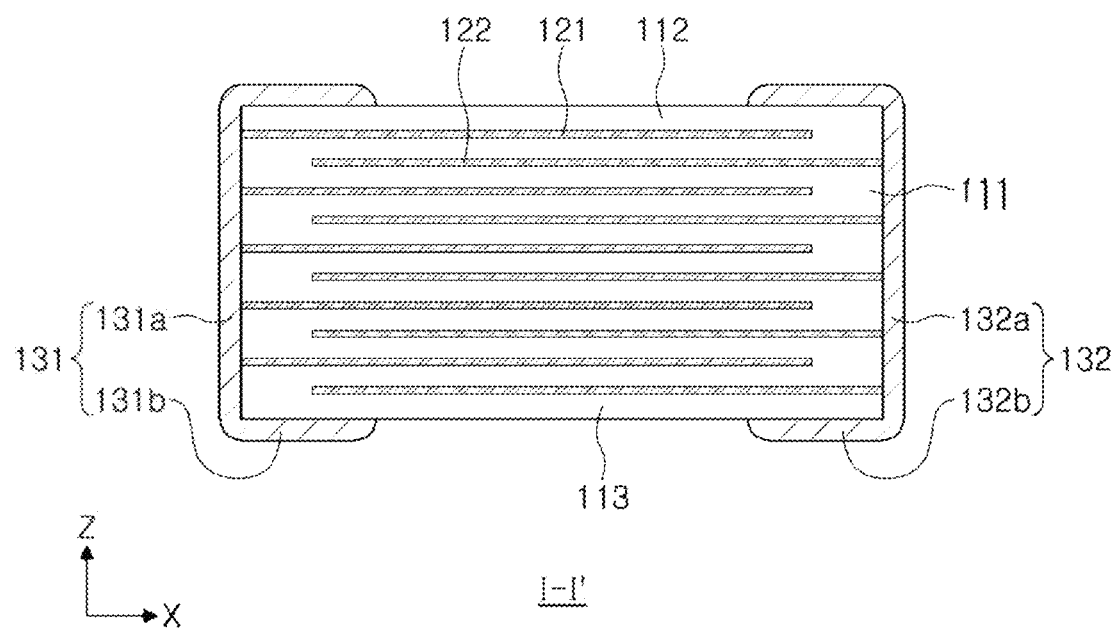
FIG. 3 is a cross-sectional view taken along line I-I' of FIG. 1.

FIG. 1 is a schematic perspective view illustrating a multilayer capacitor according to an exemplary embodiment in the present disclosure, FIGS. 2A and 2B are plan views illustrating, respectively, first and second internal electrodes of FIG. 1, and FIG. 3 is a cross-sectional view taken along line I-I' of FIG. 1.

A structure of a multilayer capacitor 100 used in an electronic component according to the present exemplary embodiment will be described with reference to FIGS. 1 through 3.

The multilayer capacitor 100 according to the present exemplary embodiment may include a capacitor body 110 and first and second external electrodes 131 and 132 on opposite end surfaces of the capacitor body 110 in the X direction, respectively.

The capacitor body 110 may be formed by stacking a plurality of dielectric layers 111 in the Z direction and then sintering the plurality of dielectric layers 111. Adjacent dielectric layers 111 of the capacitor body 110 may be integrated with each other so that boundaries therebetween are not readily apparent without using a scanning electron microscope (SEM).

In addition, the capacitor body 110 may include a plurality of dielectric layers 111 and first and second internal electrodes 121 and 122 alternately disposed in the Z direction with each of the dielectric layers 111 interposed therebetween. In this case, the first and second internal electrodes 121 and 122 may have different polarities.

In addition, the capacitor body 110 may include an active region and cover regions 112 and 113.

The active region may contribute to forming capacitance of the multilayer capacitor.

In addition, the cover regions 112 and 113 may be provided as margin portions on upper and lower surfaces of the active region in the Z direction, respectively.

The cover regions 112 and 113 may be formed by stacking a single dielectric layer or two or more dielectric layers on the upper and lower surfaces of the active region, respectively.

In addition, the cover regions 112 and 113 may basically serve to prevent the first and second internal electrodes 121 and 122 from being damaged due to physical or chemical stress.

A shape of the capacitor body 110 is not particularly limited, but may be a substantially hexahedral shape.

In the present exemplary embodiment, the capacitor body 110 may include first and second surfaces 1 and 2 opposing each other in the Z direction, third and fourth surfaces 3 and 4 connected to the first and second surfaces 1 and 2 and opposing each other in the X direction, and fifth and sixth surfaces 5 and 6 connected to the first and second surfaces 1 and 2, connected to the third and fourth surfaces 3 and 4, and opposing each other in the Y direction. Here, the first surface 1 may be a mounting surface.

In addition, a shape and dimensions of the capacitor body 110 and the number of stacked dielectric layers 111 are not limited to those illustrated in the drawings of the present exemplary embodiment.

The dielectric layer 111 may include ceramic powders such as $BaTiO_3$-based ceramic powders or the like.

An example of the $BaTiO_3$-based ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which Ca, Zr or the like, is partially solid-dissolved in $BaTiO_3$. However, the $BaTiO_3$-based ceramic powder according to the present disclosure is not limited thereto.

In addition, the dielectric layer 111 may further include a ceramic additive, an organic solvent, a plasticizer, a binder, a dispersant, and the like.

The ceramic additives may contain a transition metal oxide or a transition metal carbide, rare earth elements, magnesium (Mg), aluminum (Al), or the like.

The first and second internal electrodes 121 and 122 maybe electrodes to which voltages having different polarities are applied.

The first and second internal electrodes 121 and 122 may be formed on the dielectric layers 111 and stacked in the Z direction, respectively.

In addition, the first and second internal electrodes 121 and 122 may be alternately disposed in the capacitor body 110 to face each other in the Z direction with each of the dielectric layers 111 interposed therebetween.

In this case, the first and second internal electrodes 121 and 122 may be electrically insulated from each other by each of the dielectric layers 111 disposed therebetween.

Meanwhile, a structure in which the plurality of internal electrodes are stacked in the Z direction has been illustrated and described in the present exemplary embodiment. However, the present disclosure is not limited thereto, and may also be applied to a structure in which the internal electrodes are stacked in the Y direction, if necessary.

One end portion of the first internal electrode 121 may be exposed through the third surface 3 of the capacitor body 110.

The one end portion of the first internal electrode 121 exposed through the third surface 3 of the capacitor body 110 as described above may be electrically connected to the first external electrode 131 disposed on one end surface of the capacitor body 110 in the X direction.

One end portion of the second internal electrode 122 may be exposed through the fourth surface 4 of the capacitor body 110.

The one end portion of the second internal electrode 122 exposed through the fourth surface 4 of the capacitor body 110 as described above may be electrically connected to the second external electrode 132 disposed on the other end surface of the capacitor body 110 in the X direction.

According to the configuration as described above, when predetermined voltages are applied to the first and second external electrodes 131 and 132, electric charges may be accumulated between the first and second internal electrodes 121 and 122.

In this case, capacitance of the multilayer capacitor 100 may be in proportion to an area of the first and second internal electrodes 121 and 122 overlapping each other along the Z direction in the active region.

In addition, a material of each of the first and second internal electrodes 121 and 122 is not particularly limited.

In addition, the first and second internal electrodes 121 and 122 may be formed using a conductive paste formed of one or more of a noble metal material, nickel (Ni), and copper (Cu).

The noble metal material maybe platinum (Pt), palladium (Pd), a palladium-silver (Pd—Ag) alloy, and the like.

In addition, a method of printing the conductive paste maybe a screen-printing method, a gravure printing method, or the like, but is not limited thereto.

Voltages having different polarities may be provided to the first and second external electrodes 131 and 132, respectively, and the first and second external electrodes 131 and 132 may be disposed on the opposite end surfaces of the capacitor body 110 in the X direction, respectively, and may be electrically connected to the exposed end portions of the first and second internal electrodes 121 and 122, respectively.

The first external electrode 131 may include a first head portion 131a and a first band portion 131b.

The first head portion 131a may be disposed on the third surface 3 of the capacitor body 110.

The first head portion 131a may be in contact with the end portions of the first internal electrodes 121 externally exposed through the third surface 3 of the capacitor body 110 to serve to electrically connect the first internal electrodes 121 and the first external electrode 131 to each other.

The first band portion 131b may extend from the first head portion 131a to portions of the first, second, fifth, and sixth surfaces 1, 2, 5, and 6 of the capacitor body 110.

The first band portion 131b may serve to improve fixing strength of the first external electrode 131.

The second external electrode 132 may include a second head portion 132a and a second band portion 132b.

The second head portion 132a may be disposed on the fourth surface 4 of the capacitor body 110.

The second head portion 132a may be in contact with the end portions of the second internal electrodes 122 externally exposed through the fourth surface 4 of the capacitor body 110 to serve to electrically connect the second internal electrodes 122 and the second external electrode 132 to each other.

The second band portion 132b may extend from the second head portion 132a to portions of the first, second, fifth, and sixth surfaces 1, 2, 5, and 6 of the capacitor body 110.

The second band portion 132b may serve to improve fixing strength of the second external electrode 132.

Meanwhile, the first and second external electrodes 131 and 132 may further include plating layers.

The plating layers may include first and second nickel (Ni) plating layers disposed on the capacitor body 110 and first and second tin (Sn) plating layers covering, respectively, the first and second nickel plating layers.

Figure 4:
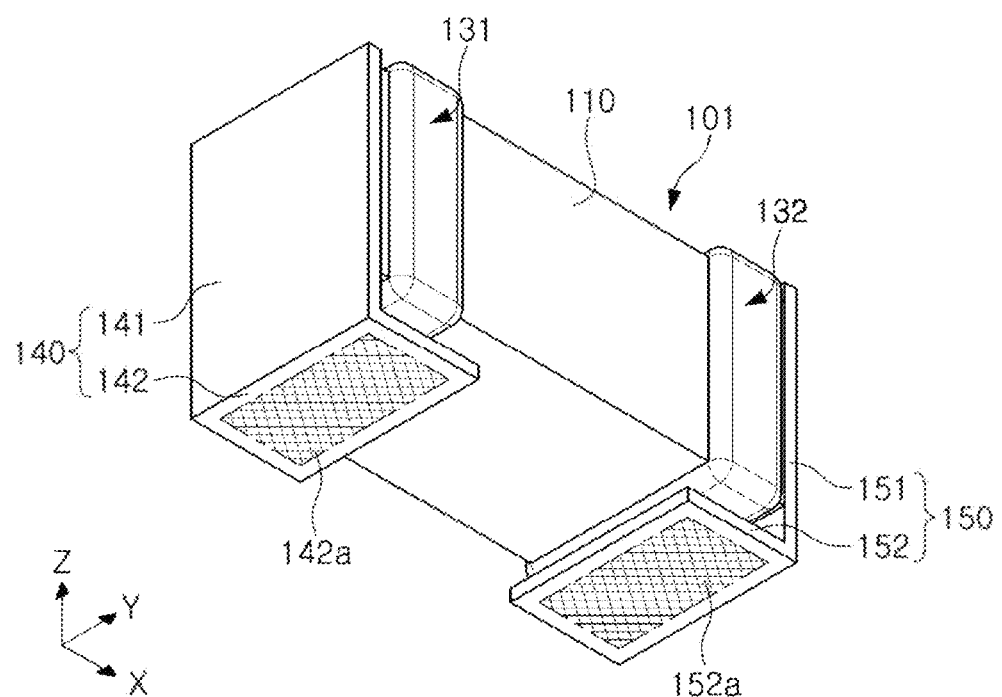
FIG. 4 is a schematic perspective view illustrating an electronic component according to an exemplary embodiment in the present disclosure.

FIG. 4 is a schematic perspective view illustrating an electronic component according to an exemplary embodiment in the present disclosure.

Referring to FIG. 4, an electronic component 101 according to the present exemplary embodiment may include a multilayer capacitor 100 including a capacitor body 110 and first and second external electrodes 131 and 132 and first and second metal frames 140 and 150 connected to the first and second external electrodes 131 and 132, respectively.

The first metal frame 140 may include a first connection portion 141 and a first mounting portion 142.

The first connection portion 141 may be bonded and physically connected to the first head portion 131a of the first external electrode 131, and may be electrically connected to the first head portion 131a of the first external electrode 131.

In this case, a first conductive bonding layer 160 may be disposed between the first head portion 131a of the first external electrode 131 and the first connection portion 141.

The first conductive bonding layer 160 may be formed of a high-temperature solder, a conductive bonding material or the like, but is not limited thereto.

The first mounting portion 142 may be bent at and extend from a lower end of the first connection portion 141 inwardly in the X direction, and be formed horizontal to the mounting surf ace.

The first mounting portion 142 may serve as a connection terminal at the time of mounting the electronic component 101 on a circuit board 210.

In this case, the first mounting portion 142 may be disposed to be spaced apart from a lower end of the multilayer capacitor 100.

In addition, the first mounting portion 142 may have a bottom surface formed as a rough surface 142a having roughness. Therefore, the first mounting portion 142 may have a surface area relatively larger than that of in a case where a bottom surface of a first mounting portion is flat (e.g., without roughness). In one example, the first mounting portion 142 may have the bottom surface formed as the rough surface 142a having roughness greater than roughness of a portion of a surface of the capacitor body 110 between the first external electrode 131 and the second external electrode 141.

In addition, such a rough surface 142a of the bottom surface of the first mounting portion 142 may be formed to have a mesh pattern through a processing method such as patterning. In one example, such a rough surface 142a of the bottom surface of the first mounting portion 142 may be formed to have protrusion portions and/or recessed portions alternately disposed or repeatedly disposed.

In this case, the rough surface 142a of the first mounting portion 142 may be formed only on a middle portion of the bottom surface of the first mounting portion 142, as illustrated in FIG. 4, and an edge portion of the first mounting portion 142 may be formed in a flat shape that does not have roughness.

However, the first mounting portion 142 is not necessarily limited thereto, and the entire bottom surface of the first mounting portion 142 may also be formed as a rough surface having roughness in consideration of a level of difficulty in a processing process, a manufacturing cost or the like, if necessary.

In addition, the rough surface of the bottom surface of the first mounting portion 142 may have various shapes.

Figure 7:
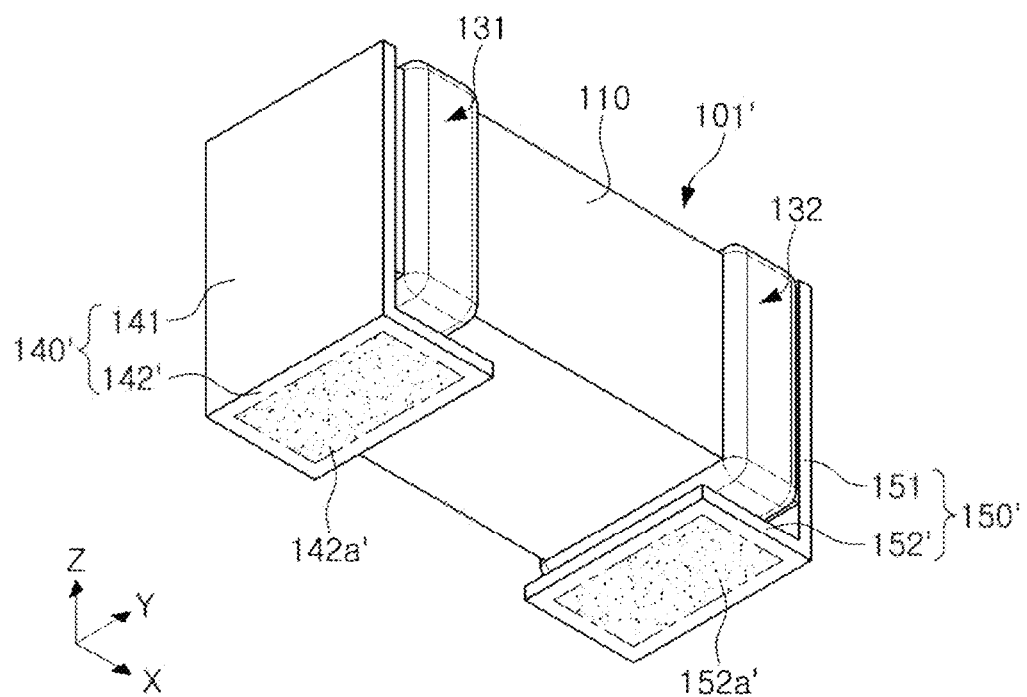
FIG. 7 is a schematic perspective view illustrating an electronic component according to another exemplary embodiment in the present disclosure.

For example, as illustrated in FIG. 7, a rough surface 142a' having roughness on a bottom surface of a first mounting portion 142' of a first metal frame 140' may be formed to have an uneven shape through a processing method such as etching or sputtering.

In this case, the uneven shape may have a regular pattern or have an irregular pattern.

The second metal frame 150 may include a second connection portion 151 and a second mounting portion 152.

The second connection portion 151 may be bonded and physically connected to the second head portion 132a of the second external electrode 132, and may be electrically connected to the second head portion 132a of the second external electrode 132.

In this case, a second conductive bonding layer 170 may be disposed between the second head portion 132a of the second external electrode 132 and the second connection portion 151.

The second conductive bonding layer 170 may be formed of a high-temperature solder, a conductive bonding material or the like, but is not limited thereto.

The second mounting portion 152 may be bent at and extend from a lower end of the second connection portion 151 inwardly in the X direction, and be formed horizontal to the mounting surface.

The second mounting portion 152 may serve as a connection terminal at the time of mounting the electronic component 101 on the circuit board 210.

In this case, the second mounting portion 152 may be disposed to be spaced apart from a lower end of the multilayer capacitor 100.

In addition, the second mounting portion 152 may have a bottom surface formed as a rough surface 152a having roughness. Therefore, the second mounting portion 152 may have a surface area relatively larger than that of in a case where a bottom surface of a second mounting portion is flat (e.g., without roughness). In one example, the second mounting portion 152 may have the bottom surface formed as the rough surface 152a having roughness greater than roughness of a portion of a surface of the capacitor body 110 between the first external electrode 131 and the second external electrode 141.

In addition, such a rough surface 152a of the bottom surface of the second mounting portion 152 may be formed to have a mesh pattern. In one example, such a rough surface 152a of the bottom surface of the second mounting portion 152 may be formed to have protrusion portions and/or recessed portions alternately disposed or repeatedly disposed.

In this case, the rough surface 152a of the second mounting portion 152 may be formed only on a middle portion of the bottom surface of the second mounting portion 152, as illustrated in FIG. 4, and an edge portion of the second mounting portion 152 may be formed in a flat shape that does not have roughness.

However, the second mounting portion 152 is not necessarily limited thereto, and the entire bottom surface of the second mounting portion 152 may also be formed as a rough surface having roughness, if necessary.

In addition, the rough surface of the bottom surface of the second mounting portion 152 may have various shapes.

For example, as illustrated in FIG. 7, a rough surface 152a' having roughness on a bottom surface of a second mounting portion 152' of a second metal frame 150' may be formed to have an uneven shape.

Figure 5:
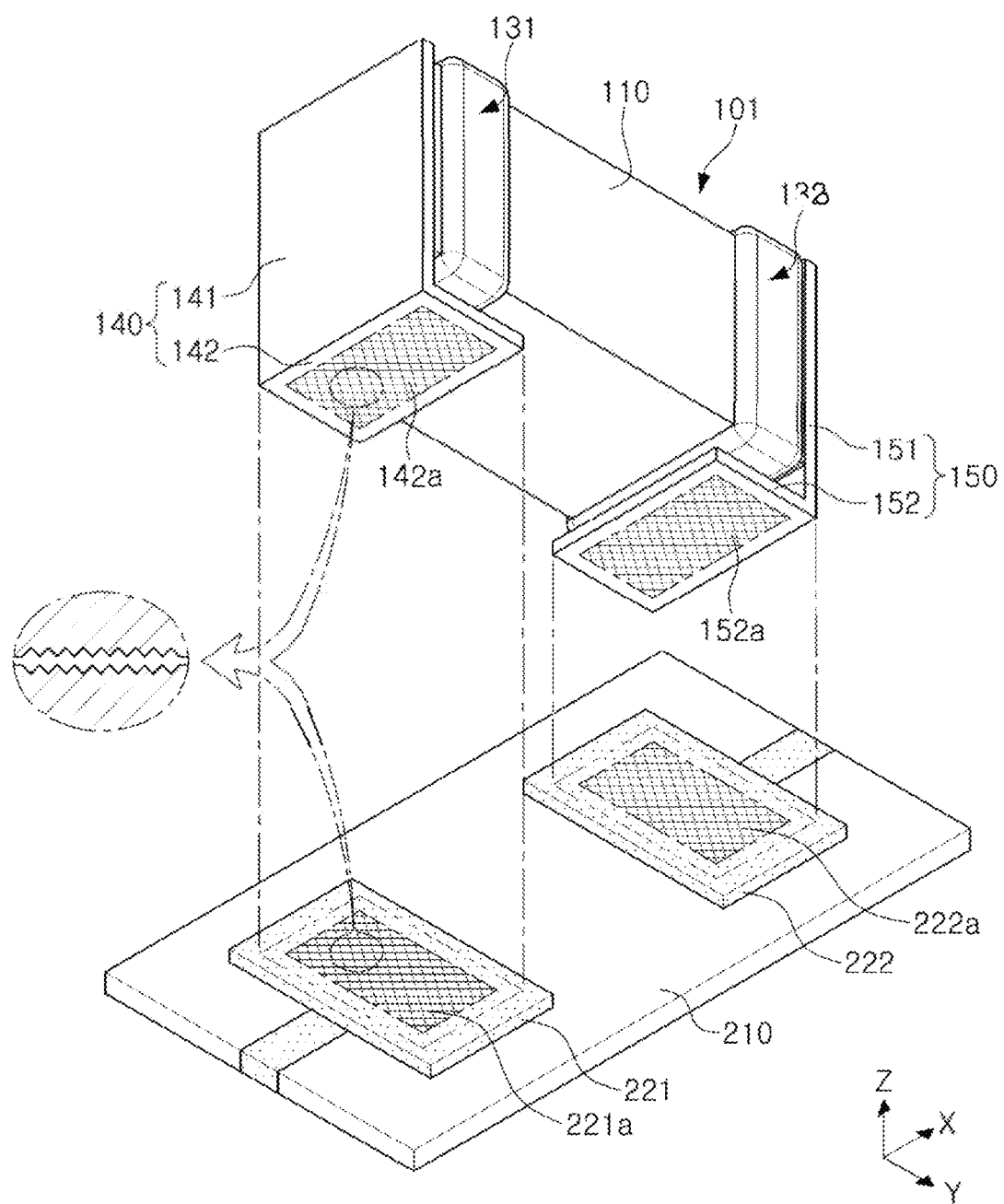
FIG. 5 is an exploded perspective view illustrating a coupling structure between the electronic component of FIG. 4 and a circuit board.
Figure 6:
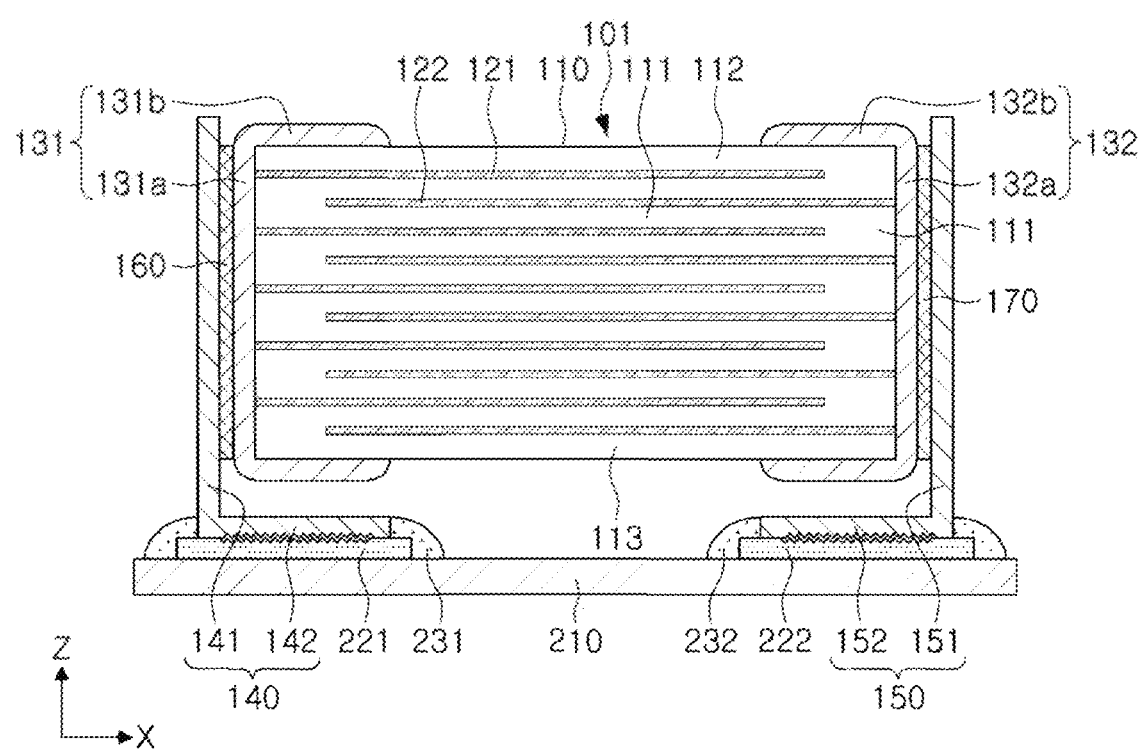
FIG. 6 is a schematic cross-sectional view illustrating a state in which the electronic component according to an exemplary embodiment in the present disclosure is mounted on the circuit board.

FIG. 5 is an exploded perspective view illustrating a coupling structure between the electronic component of FIG. 4 and a circuit board, and FIG. 6 is a schematic cross-sectional view illustrating a state in which the electronic component according to an exemplary embodiment in the present disclosure is mounted on the circuit board.

In FIGS. 5 and 6, a board having an electronic component according to the present disclosure may include a circuit board 210 and first and second electrode pads 221 and 222 disposed on an upper surface of the circuit board 210 so as to be spaced apart from each other.

The first and second electrode pads 221 and 222 may be disposed on the upper surface of the circuit board 210 so as to be spaced apart from each other in the X direction, and the bottom surfaces of the first and second mounting portions 142 and 152 of the first and second metal frames 140 and 150 maybe in contact with and be electrically connected to the first and second electrode pads 221 and 222, respectively.

In this case, the first mounting portion 142 may be bonded and physically connected to the first electrode pad 221 by a solder 231, and the second mounting portion 152 may be bonded and physically connected to the second electrode pad 222 by a solder 232.

The first electrode pad 221 may have an upper surface formed as a rough surface 221a having roughness so as to correspond to the rough surface 142a of the bottom surface of the first mounting portion 142 having the roughness.

In addition, the rough surface 221a of the upper surface of the first electrode pad 221 maybe formed in a shape substantially similar to that of the rough surface 142a of the bottom surface of the first mounting portion 142, and may be formed to have a mesh pattern in the present exemplary embodiment.

In this case, the rough surface 221a of the upper surface of the first electrode pad 221 may be formed only on a middle portion of the upper surface of the first electrode pad 221, as illustrated in FIGS. 5 and 6, an edge portion of the upper surface of the first electrode pad 221 may be formed in a flat shape that does not have roughness.

Figure 8:
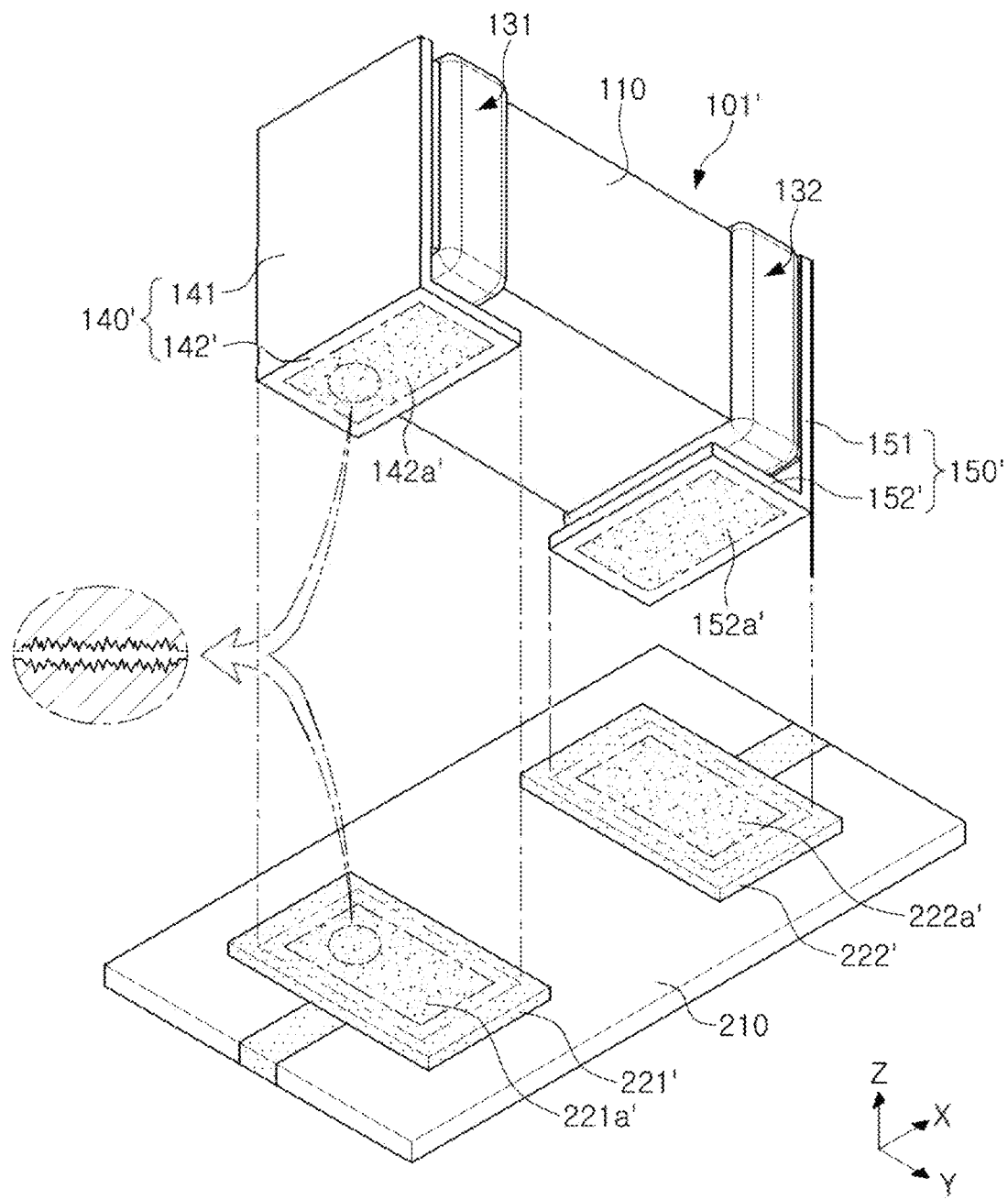
FIG. 8 is an exploded perspective view illustrating a coupling structure between the electronic component of FIG. 7 and a circuit board.
Figure 9:
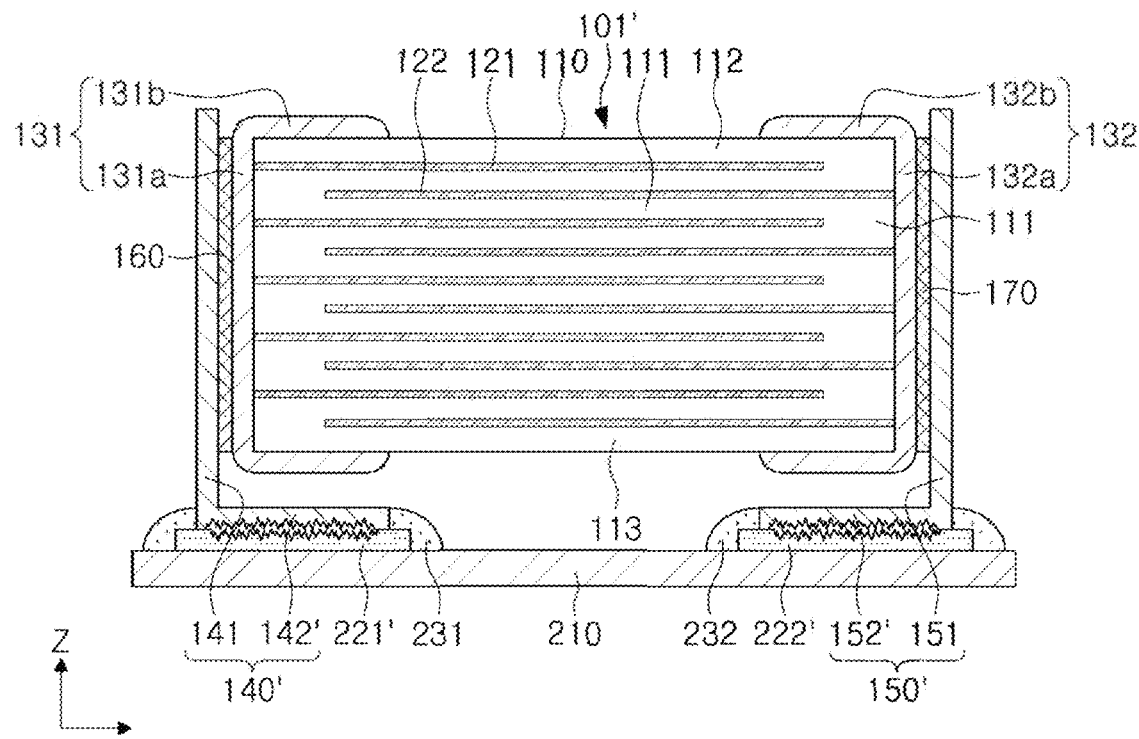
FIG. 9 is a schematic cross-sectional view illustrating a state in which the electronic component according to another exemplary embodiment in the present disclosure is mounted on the circuit board.

As another example, a rough surface 221a' of an upper surface of a first electrode pad 221' may be variously changed as necessary, such as having an uneven shape as illustrated in FIGS. 8 and 9.

In addition, the second electrode pad 222 may have an upper surface formed as a rough surface 222a having roughness so as to correspond to the rough surface 152a of the bottom surface of the second mounting portion 152 having the roughness.

In addition, the rough surface 222a of the upper surface of the second electrode pad 222 may be formed in a shape substantially similar to that of the rough surface 152a of the bottom surface of the second mounting portion 152, and may be formed to have a mesh pattern in the present exemplary embodiment.

In this case, the rough surface 222a of the upper surface of the second electrode pad 222 may be formed only on a middle portion of the upper surface of the second electrode pad 222, as illustrated in FIGS. 5 and 6, an edge portion of the upper surface of the second electrode pad 222 may be formed in a flat shape that does not have roughness.

As another example, a rough surface 222a' of an upper surface of a second electrode pad 222' may be variously changed as necessary, such as having an uneven shape as illustrated in FIGS. 8 and 9.

A multilayer capacitor according to the related art has a structure in which external electrodes thereof and a circuit board are in direct contact with each other by solders when it is mounted on the circuit board.

Therefore, heat or mechanical deformation generated by the circuit board is directly transferred to the multilayer capacitor, and it is thus difficult to secure a high level of reliability of the multilayer capacitor.

In the electronic component according to the present exemplary embodiment, a gap between the multilayer capacitor 100 and the circuit board 210 may be secured by bonding the first and second metal frames 140 and 150 to both end portions of the multilayer capacitor 100, respectively.

Therefore, when the electronic component 101 is mounted on the circuit board 210, stress may not be directly transferred from the circuit board 210 to the multilayer capacitor 100, such that thermal reliability, electrical reliability, mechanical reliability, and the like, of the electronic component 101 may be improved.

However, in a case of an electronic component using such a metal frame, a surface of the metal frame is smooth, and the metal frame may thus be easily deteriorated at a portion in contact with the electrode pad of the circuit board when the electronic component is mounted on the circuit board.

In the present exemplary embodiment, the bottom surface of the mounting portion of the metal frame maybe formed as the rough surface having the roughness.

Therefore, when the mounting portion of the metal frame is mounted on the electrode pad by the solder while being in contact with the electrode pad, an area of the mounting portion in contact with the solder may be relatively further increased as compared with a case where the bottom surface of the mounting portion is flat, and a fixing force of the mounting portion to the electrode pad may resultantly be improved.

Therefore, the electronic component may have strong durability against deformation of the circuit board in a horizontal direction, and a problem in which the electronic component is separated from the circuit board due to an environmental change such as a mechanical impact after the electronic component is mounted on the circuit board or vibrations during movement may be reduced.

In this case, the upper surface of the electrode pad of the circuit board may also be formed to have the roughness.

Therefore, the metal frame may be mounted on the circuit board in a state in which the rough surface having the roughness, of the bottom surface of the mounting portion of the metal frame is engaged with the rough surface having the roughness, of the upper surface of the electrode pad, and the electrode pad may thus hold the electronic component so that the electrode component is not shaken in the X or Y direction, which is a horizontal direction of the circuit board.

Therefore, the problem in which the electronic component is separated from the circuit board due to the environmental change such as the mechanical impact after the electronic component is mounted on the circuit board or the vibrations during movement may be further reduced.

A fixing force of the electronic component to the circuit board may be calculated by mounting forty electronic components on circuit boards for each condition, applying mechanical forces to central portions of one side surfaces of these electronic components in the Z direction with a fixing force measuring instrument, measuring forces Nat points in time when metal frames of these electronic components are separated from electrode pads of the circuit boards, and then averaging the measured forces N.

Figure 10:
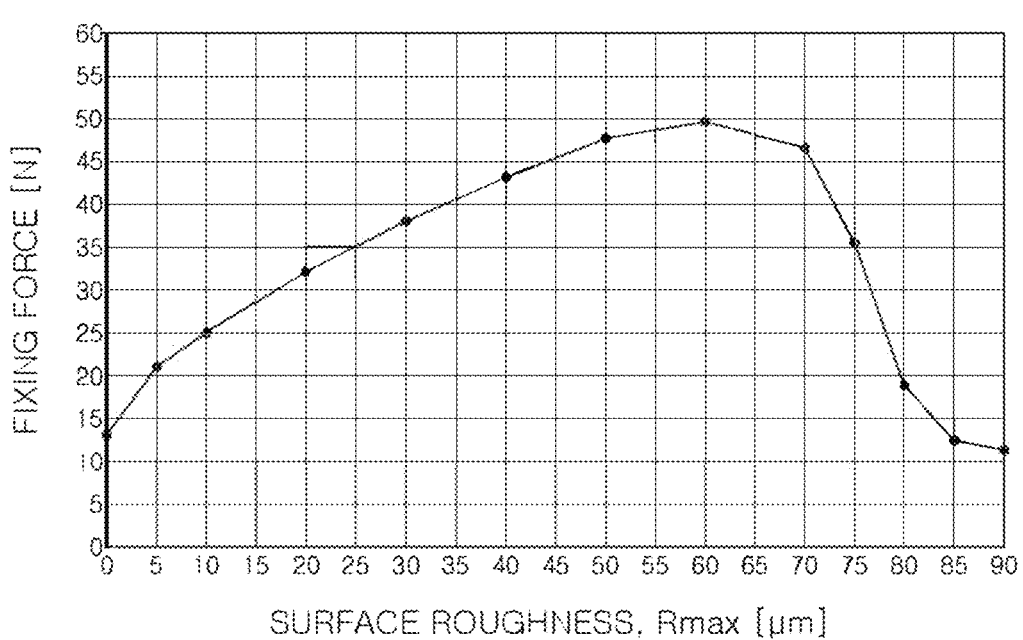
FIG. 10 is a graph illustrating a comparison result between fixing forces of the electronic component according to a change in roughness of a bottom surface of a mounting portion.

FIG. 10 is a graph illustrating a comparison result between fixing forces of the electronic component according to a change in roughness of the bottom surface of the mounting portion. Here, a thickness of the mounting portion of the metal frame was 125 μm.

Figure 11:
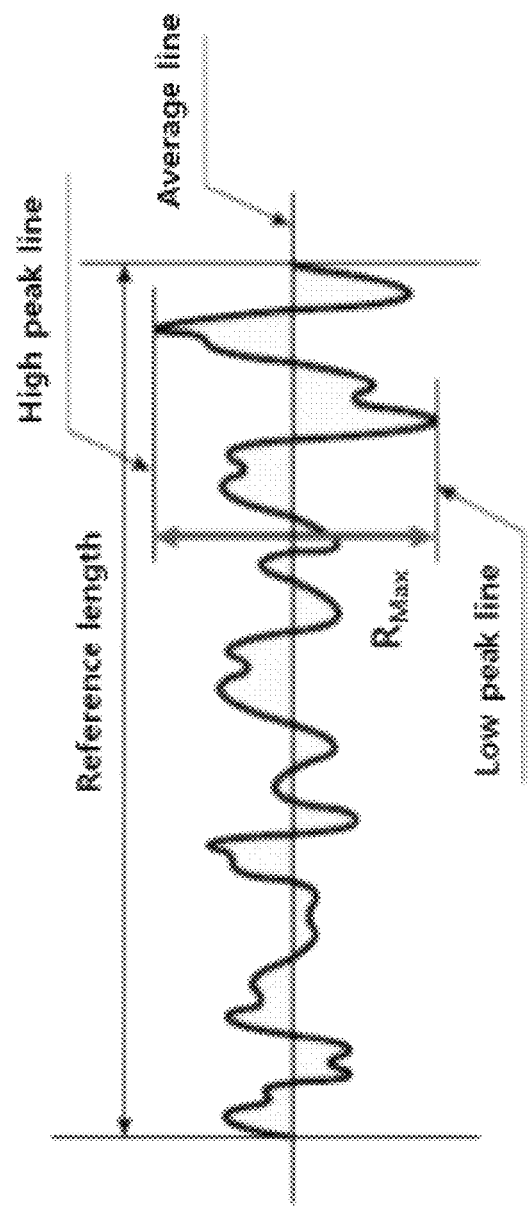
FIG. 11 is a schematic view illustrating an example to measure surface roughness Rmax.

A generally required fixing force of the electronic component to the circuit board is 20 N or more. Here, a surface roughness Rmax is a value based on a distance between the lowest point and the highest point of the rough surface cross section, that is, a maximum height. In one example, the surface roughness Rmax may be a value based on a distance between the lowest point and the highest point in a region of the rough surface cross section, that is, a maximum height between the lowest point and the highest point in the region. The region may have a width determined by one of ordinary skill in the art. FIG. 11 is a schematic view illustrating an example to measure the surface roughness Rmax. Referring to FIG. 11, the surface roughness Rmax may be a value based on a distance between a lowest point indicated by a low peak line and a highest point indicated by a high peak line in a region having a reference length in the rough surface cross section. The low peak line is a parallel line touching the lowest peak with respect to an average line obtained by the measurement, and the high peak line is a parallel line of the highest peak with respect to the average line. The rough surface cross section may be a cross section parallel to the Z direction. In one example, the cross section may be a cross section in an X-Z plane cutting a central portion of the rough surface in the Y direction, or alternatively, the cross section may be a cross section in a Y-Z plane cutting a central portion of the rough surface in the X direction. The location of the cross-section is not limited to these examples, and one of ordinary skill may select the cross section at other locations, if needed. In one example, an optical microscope, a scanning electron microscope (SEM), or a stylus profilometer may be used in the measurement. In a case that the roughness is measured by a stylus profilometer, a cross sectional cut may not be required, and in this case, a stylus of the stylus profilometer may scan a region of the rough surface to obtain the surface roughness Rmax.

Referring to FIG. 10, as a result of evaluating the fixing force while changing the surface roughness Rmax of the bottom surface of the mounting portion to 0 to 90 μm, the fixing force of the electronic component was higher than 20 N when the surface roughness of the bottom surface of the mounting portion was 5 μm or more, and the fixing force of the electronic component was 50 N, which is the highest value, when the surface roughness of the bottom surface of the mounting portion was 60 μm.

In addition, it may be confirmed that when the surface roughness of the bottom surface of the mounting portion exceeds 60 μm, a thickness of the mounting portion of the metal frame becomes excessively small, such that tearing of the mounting portion occurs, and resultantly, the fixing force of the electronic component is further decreased.

In particular, a fixing force of the metal frame to the circuit board is preferably 20 N or more, but was less than 20 N when the surface roughness of the bottom surface of the mounting portion is 80 μm.

Therefore, a preferable numerical range of the surface roughness Rmax of the bottom surface of the mounting portion of the metal frame capable of optimizing the fixing force of the electronic component to the circuit board may be a range of 5 μm or more and 75 μm or less.

In this case, when a higher fixing force is required, a preferable numerical range of the surface roughness Rmax of the upper surface of the electrode pad of the circuit board may be a range of 5 μm or more and 75 μm or less, which is the same as the numerical range of the surface roughness of the bottom surface of the mounting portion of the metal frame.

The thickness of the mounting portion of the metal frame may not be limited to 125 μm. In one example, the mounting portion of the metal frame may have the thickness of 100 μm to 300 μm. In a case of the mounting portion of the metal frame has a thickness in such a range, reliability of the electronic component may be secured, and an overall thickness of the electronic component may be preferably controlled and miniaturization of the electronic component maybe secured. In a case of the mounting portion of the metal frame has a thickness less than 100 μm, reliability of the mounting portion may be reduced and deflect may occur when the surface roughens Rmax approaches the preferred maximum thickness. On the other hand, in a case of the mounting portion of the metal frame has a thickness greater than 300 μm, an overall thickness of the electronic component may be increased and miniaturization of the electronic component may not be secured.

As set forth above, according to an exemplary embodiment in the present disclosure, durability of the multilayer capacitor against vibrations and deformation may be improved, while bonding force between the metal frame and the circuit board may be improved to improve reliability of the electronic component mounted on the circuit board.

While exemplary embodiments have been shown and described above, it will be apparent to those skilled in the art that modifications and variations could be made without departing from the scope of the present invention as defined by the appended claims.

What is claimed is:

1. An electronic component comprising:
a capacitor body;
a pair of external electrodes disposed on opposite ends of the capacitor body, respectively; and
a pair of metal frames including a pair of connection portions connected to the pair of external electrodes, respectively, and a pair of mounting portions connected to the pair of connection portions, respectively;
wherein a bottom surface of one of the pair of mounting portions has roughness greater than that of an upper surface of the one of the pair of mounting portions, and the bottom surface of the one mounting portion has a mesh pattern.

2. The electronic component of claim 1, wherein the bottom surface of the one mounting portion has protrusion portions and recessed portions alternately disposed.

3. The electronic component of claim 1, wherein the one mounting portion has a thickness of 100 μm to 300 μm.

4. The electronic component of claim 1, wherein the capacitor body includes dielectric layers and a plurality of internal electrodes alternately disposed with one of the dielectric layers interposed therebetween.

5. The electronic component of claim 1, wherein one of the pair of external electrodes includes:
- a head portion disposed on one surface of the capacitor body; and
- a band portion extending from the head portion to portions of upper and lower surfaces and both side surfaces of the capacitor body.

6. The electronic component of claim 5, wherein one of the pair of connection portions is connected to the head portion, and
- the one mounting portion is bent from a lower end of the one connection portion.

7. The electronic component of claim 1, wherein a bottom surface of the other of the pair of mounting portions has roughness.

\* \* \* \* \*